United States Patent [19]

Sagebiel

[11] Patent Number: 5,373,815

[45] Date of Patent: Dec. 20, 1994

[54] FLY COLLAR

[76] Inventor: Audrey C. Sagebiel, P.O. Box 491, Llano, Tex. 78643

[21] Appl. No.: 183,881

[22] Filed: Jan. 21, 1994

[51] Int. Cl.5 ............................................. A01K 29/00
[52] U.S. Cl. ................................................... 119/861
[58] Field of Search ............... 119/860, 861, 863, 865, 119/156, 157, 160

[56] References Cited

U.S. PATENT DOCUMENTS

| | | | |
|---|---|---|---|
| 1,732,028 | 10/1929 | Reiner | 119/861 X |
| 2,808,030 | 10/1957 | Costanzo | 119/860 |
| 3,687,114 | 8/1972 | Berkstresser | 119/156 X |
| 3,994,265 | 11/1976 | Banks | 119/865 |
| 4,338,886 | 7/1982 | McBride | 119/156 X |
| 4,926,784 | 5/1990 | Brightful et al. | 119/860 |
| 5,074,252 | 12/1991 | Morgan, Jr. | 119/156 |

*Primary Examiner*—Gene Mancene
*Assistant Examiner*—Thomas Price
*Attorney, Agent, or Firm*—Hugh E. Smith

[57] ABSTRACT

A collar primarily designed for use on horses (although it can be used on other animals) to ward off flies, a problem particularly bothersome to horses. The collar is designed to carry livestock insecticide tags normally used for cattle and is provided with a break-open device (panic snap) to prevent strangulation should the collar hang up on some object such as a tree limb while the animal is wearing such collar.

2 Claims, 4 Drawing Sheets

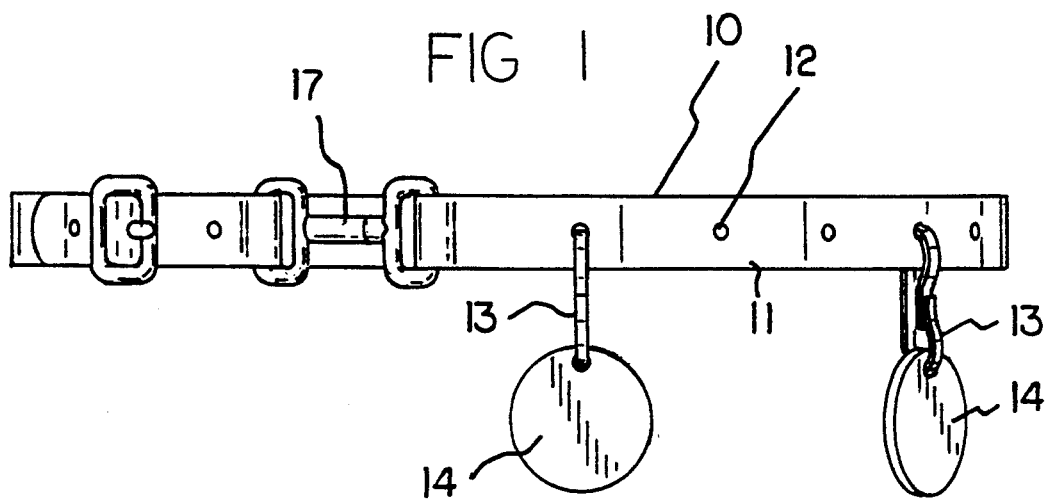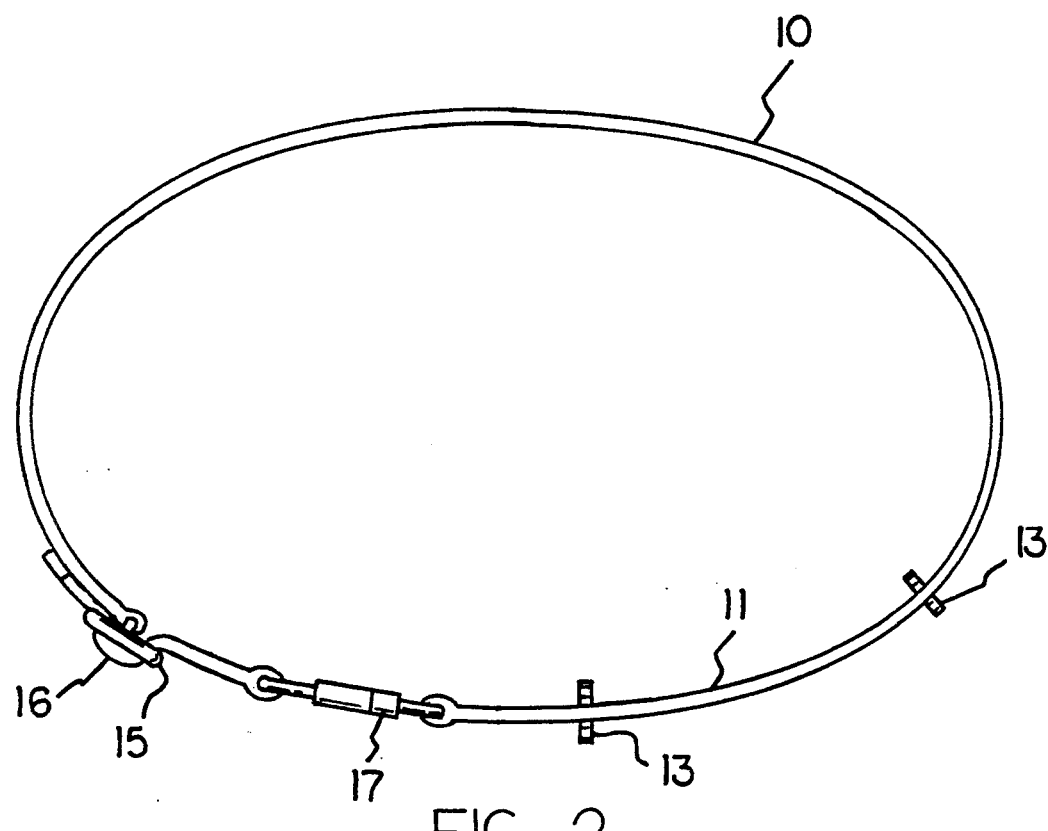

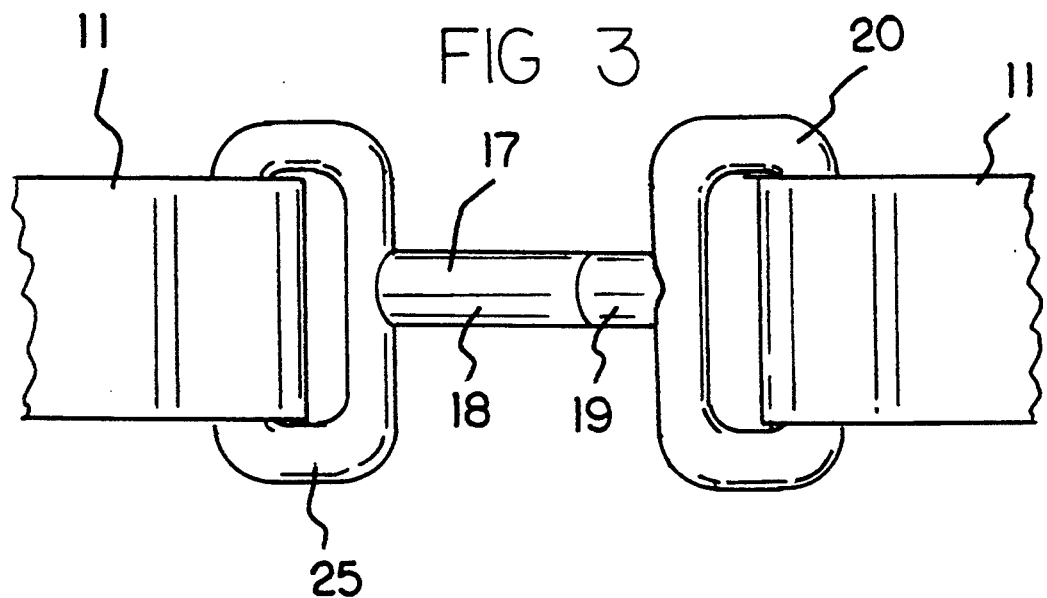
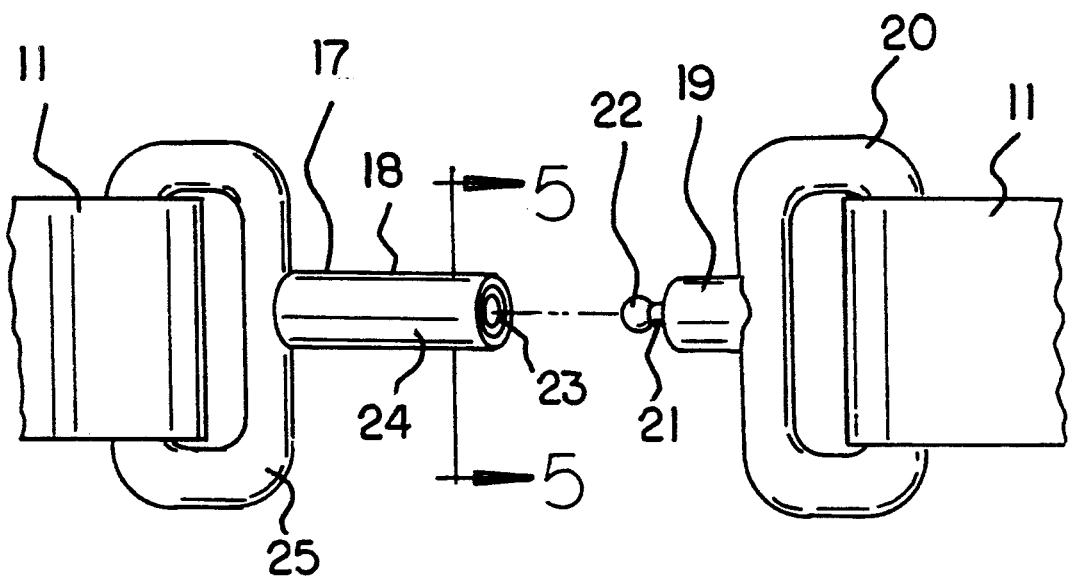

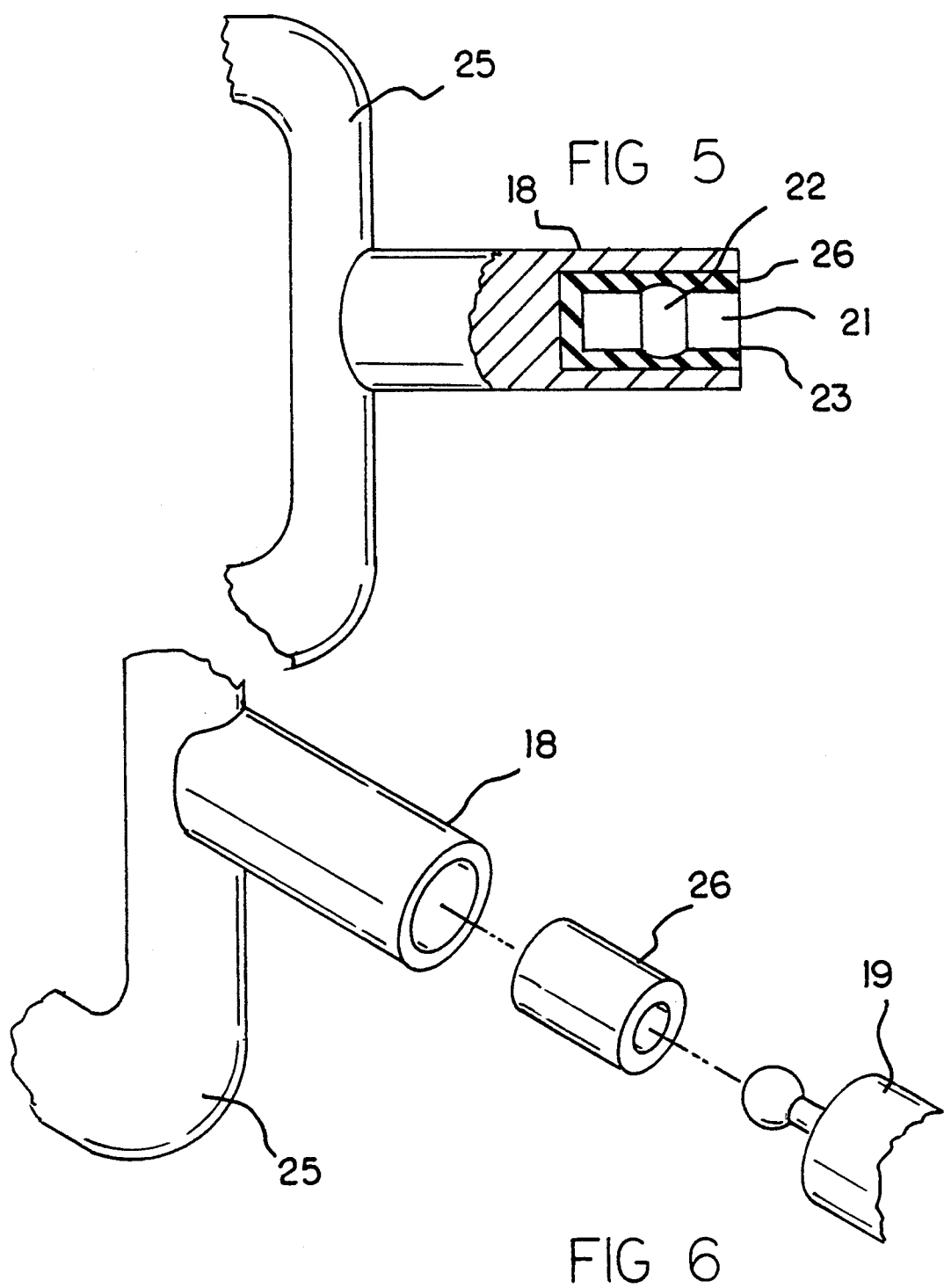

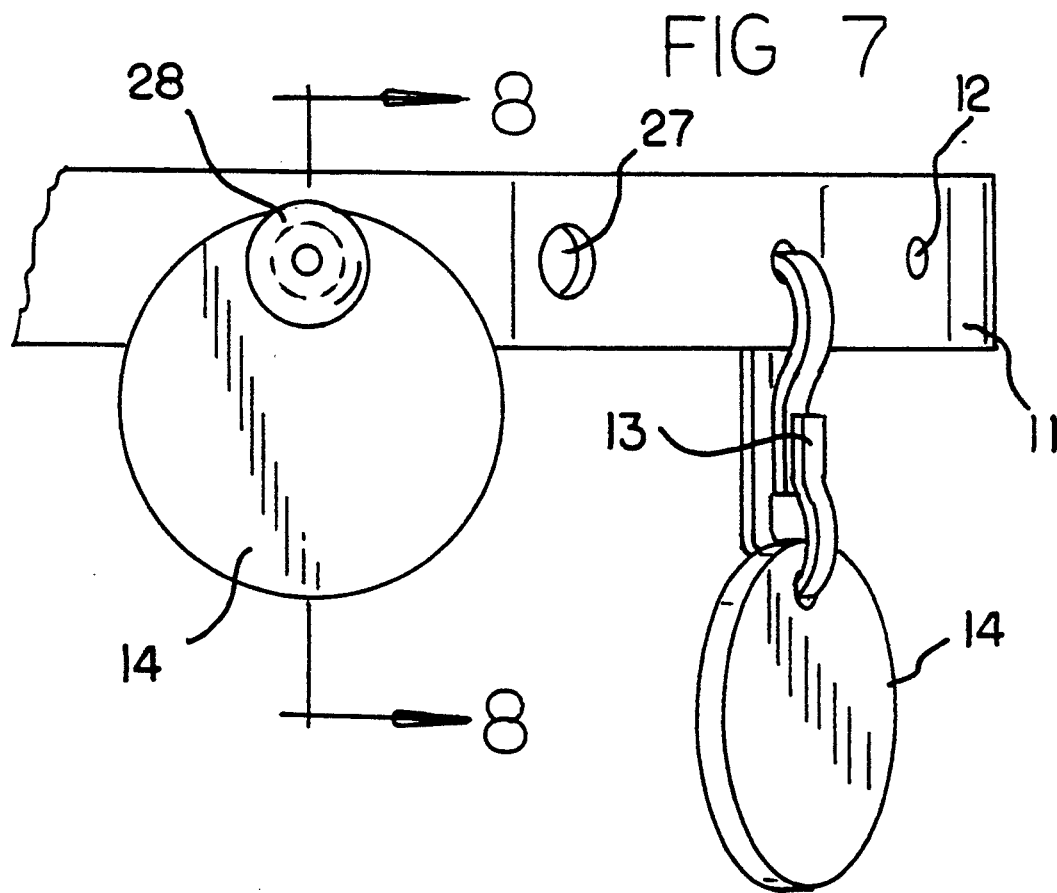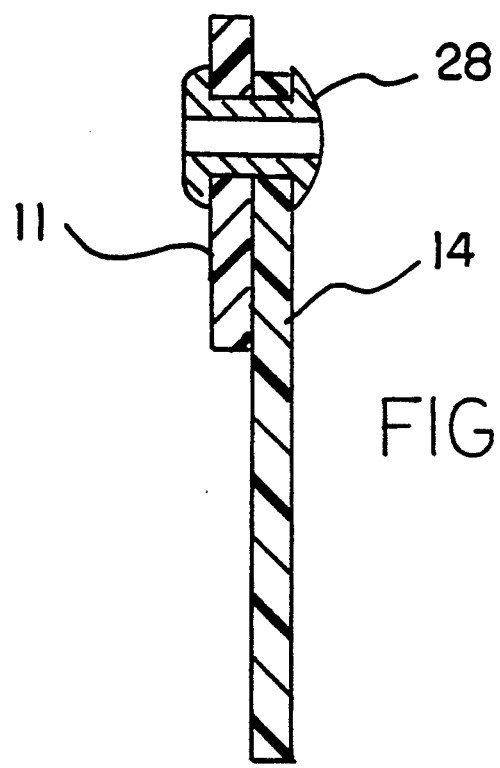

FLY COLLAR

BACKGROUND OF THE INVENTION

1. Field of the Invention

The present invention relates to animal collars and more particularly pertains to such collars which are particularly useful for horses in warding off flies therefrom.

2. Description of the Prior Art

The use of animal collars is known in the prior art. More specifically, such collars heretofore devised and utilized for the purpose of combatting insect pests which annoy or may harm an animal are known to consist basically of familiar, expected and obvious structural configurations, notwithstanding the myriad of designs encompassed by the crowded prior art which have been developed for the fulfillment of countless objectives and requirements. Most of these known collars incorporate an insecticide within the material of the collar which may irritate the skin of the animal wearing such collar. Typical of such collars are those illustrated in U.S. Pat. Nos. 4,158,051; 4,047,505; 4,967,698; and 3,811,413. This latter patent specifically recognizes the problem as it relates to horses.

In this respect, the fly collar according to the present invention substantially departs from the conventional concepts and designs of the prior art, and in so doing provides a device primarily developed for the purpose of keeping flies off horses.

Therefore, it can be appreciated that there exists a continuing need for new and improved animal collars which can be used without danger of irritation of the skin of the animal wearing such collar. In this regard, the present invention substantially fulfills this need.

SUMMARY OF THE INVENTION

In view of the foregoing disadvantages inherent in the known types of animal collars now present in the prior art, the present invention provides an improved fly collar construction wherein the same can be utilized to keep flies off horses. As such, the general purpose of the present invention, which will be described subsequently in greater detail, is to provide a new device which has many of the advantages of the animal collars mentioned heretofore and many novel features that result in a fly collar which is not anticipated, rendered obvious, suggested, or even implied by any of the prior art devices, either alone or in any combination thereof.

To attain this, the present invention generally comprises a collar primarily designed for use on horses (although it can be used on other animals) to ward off flies, a problem particularly bothersome to horses. The collar is designed to carry livestock insecticide tags normally used for cattle and is provided with a break-open device (panic snap) to prevent strangulation should the collar hang up on some object such as a tree limb while the animal is wearing such collar.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fly collar especially for horses which has many of the advantages of the insecticide collars mentioned heretofore and many novel features that result in a fly collar which is not anticipated, rendered obvious, suggested, or even implied by any of the prior art devices, either alone or in any combination thereof.

It is another object of the present invention to provide a new and improved fly collar which may be easily and efficiently manufactured and marketed.

It is a further object of the present invention to provide a new and improved fly collar which is of a durable and reliable construction.

An even further object of the present invention is to provide a new and improved fly collar which is susceptible of a low cost of manufacture with regard to both materials and labor, and which accordingly is then susceptible of low prices of sale to the consuming public, thereby making such collars economically available to the buying public.

Still yet another object of the present invention is to provide a new and improved fly collar which provides in the devices of the prior art some of the advantages thereof, while simultaneously overcoming some of the disadvantages normally associated therewith.

Still another object of the present invention is to provide a new and improved fly collar which can easily be renewed in its fly discouraging capability.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side plan view of the collar of the present invention.

FIG. 2 is a top plan view of the collar of FIG. 1.

FIG. 3 is a detail enlargement of the break-away section of the collar.

FIG. 4 is an exploded view of the section shown in FIG. 3.

FIG. 5 is a sectional view on line 5—5 of FIG. 4.

FIG. 6 is an exploded perspective view of the assembly of FIG. 5.

FIG. 7 is a side plan view of a portion of the collar illustrating alternative means for holding the insecticide discs to the collar.

FIG. 8 is a sectional view on line 8—8 of FIG. 7.

DESCRIPTION OF THE PREFERRED EMBODIMENT

With reference now to the drawings, and in particular to FIG. 1 thereof, a new and improved fly collar embodying the principles and concepts of the present invention and generally designated by the reference numeral 10 will be described.

More specifically, it will be noted that the collar 10 consists of a flexible strap 11 (preferably made of plastic or leather) having a plurality of perforations 12 therein. Such perforations 12 are designed to accept a removable clip 13 attached to a conventional cattle insecticide tag 14. Such tags 14 are available commercially and are intended to be stapled to the ears or hides of cattle but are not used on the more tender skins of horses. By using one or more dependent insecticide tags, the skin irritation usual with impregnated collars is eliminated since the tags will hang relatively freely allowing air circulation between the tag and the animal's skin. A buckle 15 and tang 16 on the ends of the collar strap 11 permits securing the collar about a horse's neck. Interposed in the strap 11 is a break-away section 17 which will separate upon stress being applied to the collar 10 to prevent strangulation of the animal in the event a branch or other object becomes engaged in the collar 10. As illustrated in FIGS. 3 through 6, such break-away section 17 has an in-line (relative to the collar 10) separation. If the separating mechanism pulls into or out from the collar, there is a tendency for such mechanism to bind up, thereby defeating its purpose.

Referring now to FIGS. 3 and 4, the break-away section 17 is illustrated in detail. FIG. 3 shows section 17 closed while FIG. 4 shows it in its separated position. Section 17 comprises basically two parts, i.e. a receptacle end 18 and a fastening end 19. End 19 has a stud 20 projecting from and affixed to a rigid loop 20 adapted to be received within a loop of the strap 11 and secured to such strap 11. Projecting from stud 19 is a pin 21 having a circular ball 22 on the end thereof. Ball 22 and pin 21 are adapted to fit within an accepting open end 23 on receptacle end 18 on a similar stud 24 affixed to a rigid loop 25. As shown subsequently, ball 22 is frictionally engaged within receptacle end 18. Any exceptional stress or pull on strap 11 will be transmitted along such strap and the in-line configuration of ball 22 and the receptacle end 18 will permit ready and reliable separation.

In FIG. 5 a sectional view of the receptacle end 18 is shown illustrating that it insists of a flexible compressible (usually rubber or soft plastic) elastomeric insert 26 which engages with and frictionally holds ball 22 when such ball 22 is pushed into the open end 23 of receptacle end 18. FIG. 6 shows in exploded form the receptacle end 18, fastening end 19 and the flexible insert 26.

FIGS. 7 and 8 illustrate an alternate means for fastening insecticide tags 14 to the collar 10. Here, larger perforations 27 may be provided in strap 11 in place of or in addition to the standard perforation 12. Perforations 27 will accept a rivet 28 from a standard rivet gun (not shown) and such rivet 28 may be used to affix tags 14 to strap 11 instead of utilizing clips 13 if desired.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A fly collar comprising:

a flexible collar strap having at least one collar strap aperture extending therethrough, said flexible collar strap comprising a first length of flexible collar strap material removably coupled to a second length of flexible collar strap material;

securing means to secure said flexible collar strap about a neck of an animal, said securing means comprising a buckle secured to a first end of said first length of flexible collar strap material and being selectively couplable to a first end of said second length of flexible collar strap material;

an insecticide tag having a hanging aperture therethrough;

a removable clip for securing said insecticide tag to said flexible collar strap, said removable tag comprising a length of clip material having first and second end portions, and a center portion, with said first end portion being folded back upon said center portion and spaced therefrom, and said second end portion being folded back upon said center portion and spaced therefrom, said first end portion having a first distal end and said second end portion having a second distal end, with said first distal end being positioned against said second distal end of said second end portion between said second distal end and said center portion, said removable clip extending through both said hanging aperture of said insecticide tag and said collar strap aperture of said collar, whereby said first end portion can be manually biased towards said center portion and away from said second distal end of said second end portion to permit selective removal of said insecticide tag from said removable clip;

separating means for removably coupling second ends of said first and second lengths of flexible collar strap material together for releasing said strap upon an application of stress to said strap, said separating means comprising a first rigid loop having a first stud projecting orthogonally therefrom, a pin projecting colinearly from said first stud and said pin having a first diameter, with a circular ball fixedly secured to an outer distal end of said pin and said circular ball having a second diameter, said second end of said first length of flexible collar strap material extending through said first rigid loop and being coupled to itself to mount said first rigid loop to said second end of said first length of flexible collar strap material; and a second rigid loop having a second stud projecting orthogonally therefrom, said second stud being substantially hollow, with a flexible elastomeric insert concentrically positioned within said hollow second stud, said elastomeric insert being substantially hollow and having a first interior portion of said first diameter for resiliently receiving said pin and said circular ball therethrough, said insert further having a second interior portion of said second diameter, said second interior portion resiliently receiving and removably capturing said circular ball to releasably couple said second end of said first length of flexible collar strap material to said second end of said second length of flexible collar strap material.

2. A fly collar comprising:

a flexible collar strap having at least one collar strap aperture extending therethrough, said flexible collar strap comprising a first length of flexible collar strap material removably coupled to a second length of flexible collar strap material;

securing means to secure said flexible collar strap about a neck of an animal, said securing means comprising a buckle secured to a first end of said first length of flexible collar strap material and being selectively couplable to a first end of said second length of flexible collar strap material;

an insecticide tag having a hanging aperture therethrough;

a rivet extending through said hanging aperture of said insecticide tag and said collar strap aperture to permanently secure said insecticide tag to said flexible collar strap;

separating means for removably coupling second ends of said first and second lengths of flexible collar strap material together for releasing said strap upon an application of stress to said strap, said separating means comprising a first rigid loop having a first stud projecting orthogonally therefrom, a pin projecting colinearly from said first stud and said pin having a first diameter, with a circular ball fixedly secured to an outer distal end of said pin and said circular ball having a second diameter, said second end of said first length of flexible collar strap material extending through said first rigid loop and being coupled to itself to mount said first rigid loop to said second end of said first length of flexible collar strap material; and a second rigid loop having a second stud projecting orthogonally therefrom, said second stud being substantially hollow, with a flexible elastomeric insert concentrically positioned within said hollow second stud, said elastomeric insert being substantially hollow and having a first interior portion of said first diameter for resiliently receiving said pin and said circular ball therethrough, said insert further having a second interior portion of said second diameter, said second interior portion resiliently receiving and removably capturing said circular ball to releasably couple said second end of said first length of flexible collar strap material to said second end of said second length of flexible collar strap material.

* * * * *